Patented July 2, 1940

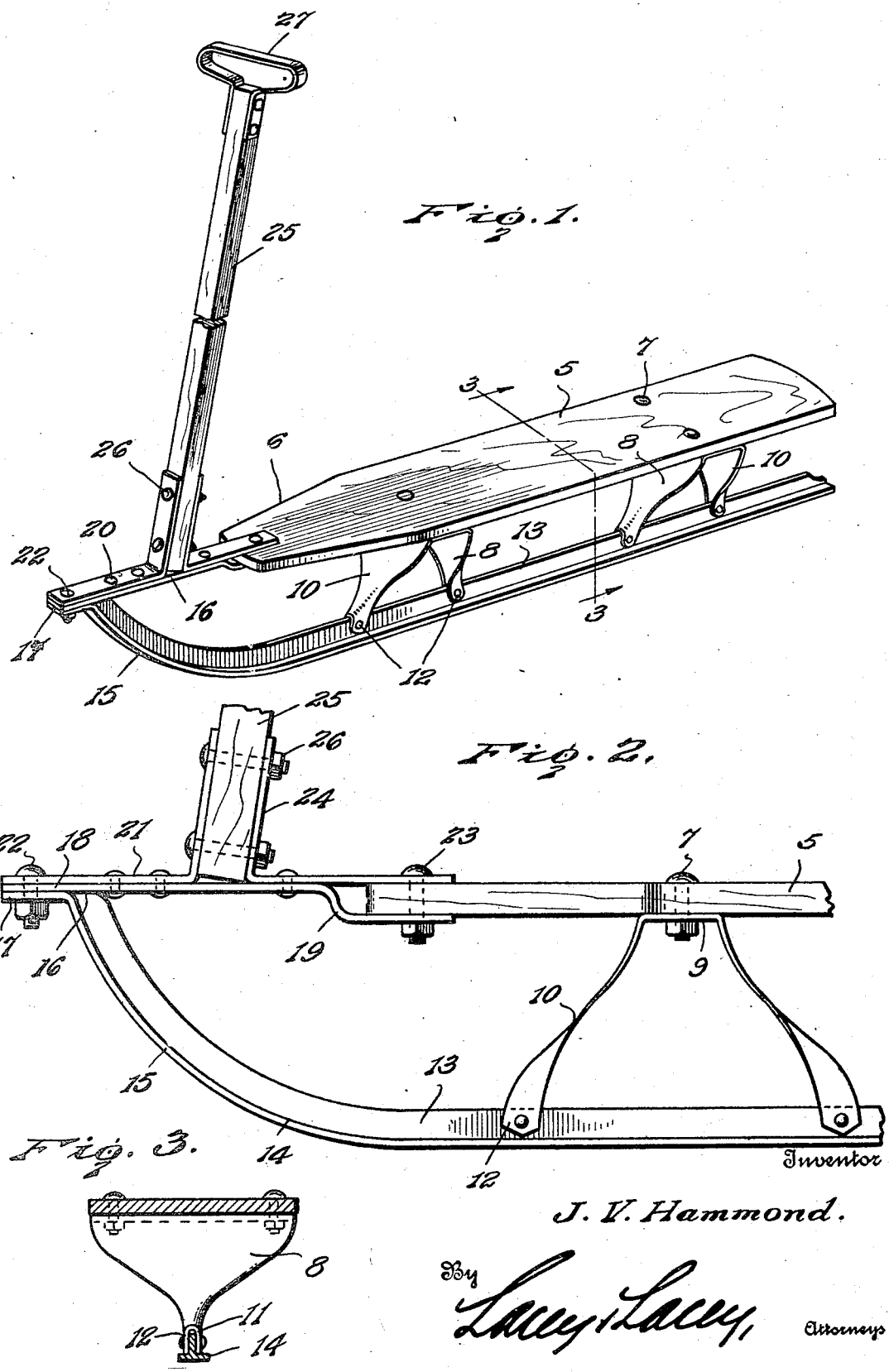

2,206,035

UNITED STATES PATENT OFFICE 2,206,035

SCOOTER SLED

John V. Hammond, Spangler, Pa., assignor of one-fourth to John F. Foreman, Elmore, Pa.

Application June 8, 1938, Serial No. 212,582

6 Claims. (Cl. 280—22)

This invention relates to sleds and more particularly to a novel form of scooter sled.

The object of the invention is to provide a comparatively simple and inexpensive device of the class described particularly designed for use by children during the winter season for coasting down hills or on other snow or ice covered surfaces and which will not only afford an entertaining diversion but also provide an exhilarating and healthful sport for the children.

A further object of the invention is to provide a scooter sled comprising a foot-receiving platform having a single runner extending longitudinally thereof and pivotally connected with the forward end of the platform by a flat bar carrying a hand support for guiding the scooter when traveling over ice or snow covered surfaces.

A further object is to anchor the runner to the foot-receiving platform by means of braces which extend transversely beneath said platform and serve to reinforce and strengthen the same.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a perspective view of a scooter sled embodying the present invention, Figure 2 is an enlarged side elevation of the forward part of the device, and Figure 3 is a transverse sectional view taken on the line 3—3 of Figure 1.

The improved scooter sled forming the subject-matter of the present invention comprises a foot-receiving platform 5 of any desired length and width and formed of wood or other suitable material, said platform having its side edges at the forward end thereof inclined or beveled at 6 to produce a streamline effect. Secured to the lower surface of the platform 5 by bolts or similar fastening devices 7 are supporting brackets 8, each preferably formed of a sheet of metal having its intermediate portion bent to form a flat surface 9 and its opposite ends extended downwardly to produce diverging legs 10, the terminals of which are bifurcated at 11 to form oppositely disposed attaching lips 12 adapted to receive the upstanding flange or fin 13 of a runner 14 and to which they are riveted or otherwise rigidly secured, as shown. The front end of the runner 14 is curved upwardly in advance of the adjacent end of the platform 5, as indicated at 15, and the fin 13 of the runner is cut away, at 16, the base of the runner at said cut-away portion being bent laterally to form a terminal lug 17. A flat metal bar 18 forms a pivotal connection between the lug 17 and the forward portion of the foot-receiving platform 5, the rear end of the bar 18 being offset at 19 and thence extended longitudinally beneath and in contact with the platform 5, as best shown in Figure 2 of the drawing. Secured to the connecting bar 18 by bolts or rivets 20 is a sectional strap iron 21, the forward end of the strap iron being secured to the lug 17 by a bolt 22 while the rear end of the strap iron bears against the upper surface of the platform 5 and is secured thereto by a pivot bolt 23 which extends through said strap iron, platform and offset portion of the bar 19. The strap iron 21 is preferably formed in two sections, the inner ends of which are bent upwardly at 24 to form a socket for the reception of the lower end of a vertical bar or hand support 25. The lower end of the vertical support 25 is secured within the socket by bolts 26 while the upper end thereof is provided with a handhold or loop 27 adapted to be grasped by a child when his foot is supported on the receiving platform and the device is used for coasting down hills or over a flat snow or ice covered surface. Inasmuch as the bar 16 is pivotally connected with the forward end of the foot-receiving platform and the strap iron is rigidly secured to said bar, the forward upwardly curved portion of the runner may be flexed laterally to either side of the longitudinal axis of the platform by exerting a lateral pressure on the upright 25 so as to permit a child to readily guide the scooter, as will be readily understood.

It will here be noted that the intermediate flat portions 9 of the braces 8 are disposed in contact with and extend the entire width of the foot-receiving platform 5 so as to reinforce and strengthen the same and prevent danger of cracking or breaking when subjected to the weight of a child. It will also be noted that, when viewed in side elevation, the legs 10 diverge in the direction of the runner 13 and, when viewed in front elevation or cross section, converge in the direction of the reinforcing fin 13 of the runner so that said runner is accurately and permanently centered with respect to the longitudinal axis of the receiving platform while at the same time a strong substantial underpinning or base is provided for said platform.

In operation, a child places one foot on the receiving platform 5 and after grasping the handle 27 uses his other foot on the ground to propel the scooter until it has obtained sufficient momentum when by lifting the propelling foot off the ground he may coast down a hill or over any flat ice or snow covered surface in the same manner as if he were riding on a regular sled.

The device is light in weight and strong and durable in construction and will afford an entertaining diversion for children while at the same time provide a healthful and exciting sport particularly when several children are equipped with the scooters and vie or compete with each other in races or the like.

It will, of course, be understood that the scooters may be made in different sizes and shapes and painted, Japanned or otherwise ornamented to give them a neat attractive appearance.

Having thus described the invention, what is claimed as new is:

1. A scooter sled comprising a foot-receiving platform, a runner disposed beneath and secured to the platform, a bar forming a pivotal connection between the forward end of the runner and the adjacent end of the platform, and a hand support mounted on the bar and extending upwardly therefrom in spaced relation to said platform and runner.

2. A scooter sled comprising a foot-receiving platform, a single runner disposed beneath and secured to the platform, a bar forming a pivotal connection between the forward end of the runner and the adjacent end of the platform, a strap iron secured to the bar and coacting with said bar to form a seat for the forward end of the platform, a socket carried by the strap iron, and a hand support secured within the socket.

3. A scooter sled comprising a foot-receiving platform, a single runner disposed beneath the platform, braces extending transversely of the platform and having their lower ends bifurcated to form seats for the runner, means for securing the runner in said seats, a bar secured to the forward end of the runner and having its rear end offset and pivotally connected with the platform, a strap iron secured to the bar and coacting with the offset portion of said bar to form a seat for the adjacent end of the platform, a pivot bolt extending through the strap iron, platform and offset portion of the bar, a socket carried by the strap iron, and a hand support secured within the socket.

4. A scooter sled comprising a foot-receiving platform, a runner disposed beneath the platform and provided with a vertical fin, the forward end of the runner being curved upwardly, brackets having their intermediate portions bent to form flat bearing surfaces extending the entire width of the platform and rigidly secured thereto, said brackets being provided with diverging legs having their lower ends bifurcated to form seats adapted to receive the fin of the runner, bolts extending through the bifurcated portions of the braces and the fin of the runner, a bar forming a pivotal connection between the curved forward portion of the runner and the adjacent forward portion of the platform, a socket carried by the bar, and an upright hand support having its lower end secured within the socket and its upper end provided with a handle.

5. A scooter sled comprising a foot-receiving platform having its forward end tapered, a runner disposed beneath the platform at the medial longitudinal line thereof and provided with a vertical fin, the forward end of the runner being curved upwardly, brackets having intermediate flat portions extending the entire width of the platform and rigidly secured to the under side thereof, said brackets being provided with diverging legs having their lower ends bifurcated to form spaced lips adapted to receive the fin of the runner, the side walls of each leg converging in the direction of the fin of the runner, a bar having one end thereof rigidly secured to the curved portion of the runner and its other end pivotally connected with the tapered portion of the platform, a sectional strap rigidly secured to the bar, a pivot bolt passing through one of the strap sections, platform and bar, the inner ends of said strap sections being bent upwardly to form a socket, and an upright hand support having its lower end secured within the socket and its upper end provided with a handle.

6. A scooter sled comprising an elongated foot-receiving platform, a runner disposed beneath the platform at the medial longitudinal line thereof and provided with an upstanding fin, the forward portion of the runner being curved upwardly and thence bent laterally to form an attaching lug, the fin at said lug being cut-away, a bar having one end thereof resting on the lug and its other end offset and extended longitudinally to form a seat for the adjacent end of the platform, a sectional strap iron secured to the bar, the inner ends of the strap iron sections being bent upwardly to form a socket, a pivot bolt passing through one of the strap iron sections, receiving platform and offset portion of the bar, a bolt passing through the other strap iron section, bar and said attaching lug, and an upright hand support fitted within the socket and provided with an operating handle.

JOHN V. HAMMOND.